United States Patent [19]
Nissel

[11] Patent Number: 5,318,810
[45] Date of Patent: Jun. 7, 1994

[54] FOOD TRAY AND METHOD OF MAKING THE SAME

[75] Inventor: Frank R. Nissel, Ambler, Pa.

[73] Assignee: Welex Incorporated, Blue Bell, Pa.

[21] Appl. No.: 998,393

[22] Filed: Dec. 30, 1992

[51] Int. Cl.$^5$ .............................. B32B 1/08; B65D 6/00
[52] U.S. Cl. ..................... 428/35.7; 428/36.9; 428/36.92; 219/734; 220/4.23; 220/DIG. 12; 220/DIG. 14
[58] Field of Search ............... 219/10.55 E; 428/34.7, 428/35.7, 36.9, 36.92; 220/531, 259, DIG. 12, DIG. 14, 4.23

[56] References Cited

U.S. PATENT DOCUMENTS

| | | | |
|---|---|---|---|
| 3,865,302 | 2/1975 | Kane | 426/113 |
| 4,351,997 | 9/1982 | Mattisson et al. | 219/10.55 E |
| 4,390,649 | 6/1983 | Aharoni | 524/167 |
| 4,521,359 | 6/1985 | Tsien | 264/171 |
| 4,533,510 | 8/1985 | Nissel | 264/171 |
| 4,562,023 | 12/1985 | Pabst et al. | 264/171 |
| 4,704,510 | 11/1987 | Matsui | 219/10.55 E |
| 4,753,766 | 6/1988 | Pinsolle | 264/171 |
| 4,765,999 | 8/1988 | Winter | 428/347 |
| 4,776,383 | 10/1988 | Heinemann et al. | 164/423 |
| 4,809,876 | 3/1989 | Tomaswick et al. | 428/35.8 |
| 4,839,131 | 6/1989 | Cloeren | 264/171 |
| 4,888,459 | 12/1989 | Keefer | 219/10.55 E |
| 4,933,193 | 6/1990 | Fisher | 219/10.55 E |
| 5,032,448 | 7/1991 | Mendenhall | 428/189 |
| 5,039,001 | 8/1991 | Kinigakis et al. | 229/120 |
| 5,095,186 | 3/1992 | Russell et al. | 219/10.55 E |
| 5,124,519 | 6/1992 | Roy et al. | 219/10.55 E |

*Primary Examiner*—George F. Lesmes
*Assistant Examiner*—Blaine Copenheaver
*Attorney, Agent, or Firm*—Austin R. Miller

[57] ABSTRACT

A food container thermoformed from nucleated polyethylene terephthalate sheet. The food container comprises an opaque or colored tray formed from nucleated polyethylene terephthalate in a crystalline state so that the tray remains rigid at elevated temperatures. The food container also comprises a substantially transparent cover formed from nucleated polyethylene terephthalate in an amorphous state. The food container also comprises a hinge that connects the cover to the tray. The method for producing this food container comprises the steps of extruding nucleated polyethylene terephthalate into a continuous sheet; independently controlling the temperature of the mold portions for the cover, tray and hinge components of the food container; thermoforming the nucleated polyethylene terephthalate sheet; maintaining the tray component of the container at a temperature sufficient to crystallize the nucleated polyethylene terephthalate in the tray component; and cooling the cover component of the container to a temperature sufficient to produce nucleated polyethylene terephthalate in an amorphous state.

7 Claims, 4 Drawing Sheets

FOOD TRAY AND METHOD OF MAKING THE SAME

BACKGROUND OF THE INVENTION

This invention relates to a food container having a tray with excellent heat distortion characteristics and an integrally hinged clear plastic cover. The tray is formed from crystallized polyethylene terephthalate resin and remains rigid even when in physical contact with food products at high temperatures. The cover is formed from amorphous polyethylene terephthalate and remains substantially clear so as to allow the display or inspection of food products within the container. This cover is integrally hinged to the tray to facilitate refuse collection and disposal. This invention also relates to a method for producing this new food container.

FIELD OF THE INVENTION

Food service boxes with colored or opaque trays and integrally hinged clear lids have been on the market for over ten years. These boxes provide an attractive display of their contents even when closed, and the single piece construction of these food service boxes permits the disposal of the box and any debris it may contain in one piece. Because of these benefits, such food service boxes have been widely used on airplanes, buses and trains to serve prepared meals and snacks.

The common use of microwave ovens to prepare meals and snacks has manifested several significant limitations of existing food service boxes. Because food products prepared in microwave ovens can reach temperatures exceeding 200° F., container materials contacting such food products must have heat distortion temperatures that comfortably exceed that level. Manufacturers of existing food service boxes, however, have not yet been successful in developing an inexpensive food container capable of use in a microwave oven and having an integrally hinged clear plastic cover to permit the display or inspection of food products in the container.

Existing food service boxes are frequently formed from clear or colored polystyrene resins. Polystyrene resins, however, have a low heat distortion temperature of approximately 160° F. Therefore, polystyrene food service boxes cannot be properly used to heat food products in microwave ovens. Polyethylene terephthalate (PET) has also been used in existing food service boxes. As with polystyrene, the heat distortion temperature of PET is inadequate for use in microwave ovens where food temperatures can exceed 200° F.

Although transparent polymers such as polyetherimide and polycarbonate do have acceptable heat distortion temperatures for use even in microwave ovens, these polymers are too expensive for disposable use. Lower cost polymers with acceptable heat distortion temperatures such as modified polyphenylene oxide (PPO) and acrylonitrile butadiene styrene (ABS) are commercially available. These polymers, however, are opaque and cannot be used to form a container cover through which food products can be inspected.

It is known to manufacture food service boxes having food contacting surfaces made from crystallized PET to provide higher heat distortion temperatures. If such boxes are made in a one-piece construction according to traditional manufacturing methods, however, the crystallized PET cover exhibits a milky or opaque appearance which prevents the display or inspection of food products within the container. Similarly, one-piece food service boxes formed from transparent and amorphous PET are not suitable for use in microwave ovens because the food-contacting surfaces will not remain rigid when in contact with food at elevated temperatures.

Accordingly, there is a great and thus far unsatisfied demand for a low cost, disposable food service box having food contacting surfaces that remain rigid at elevated temperatures, a clear cover to permit the display and inspection of the container contents, and an integral hinge creating a one-piece construction for easy disposal of the entire container and the enclosed debris.

DESCRIPTION OF THE PRIOR ART

It is known that manufacturers have thermoformed nucleated PET to produce "dual-ovenable" food trays. These trays can be heated in either traditional ovens at temperatures up to 400° F. or in microwave ovens. Manufacturers of such food containers have not, however, been capable of producing a one-piece microwavable food container having a clear cover to allow the display or inspection of food products within the food container.

It is also known that manufacturers are capable of producing a food container having a transparent cover and an opaque or colored tray. Such containers are made by using at least two extruders to feed a sheet extrusion die designed such that approximately one-half of the resulting thermoplastic sheet is transparent while the other half is opaque or colored. One such die is described in U.S. Pat. No. 4,533,510 for a method and apparatus for continuously co-extruding a sheet, the inventor of which is the applicant herein. Such co-extruded sheet is subsequently thermoformed into hinged containers by conventional thermoforming methods with the border between the transparent and opaque or colored portions of the sheet falling between the mold halves which form the upper and lower cavities of the food container. These upper and lower cavities are then folded together about the border to produce the food container.

The methods of producing such food containers do not, however, include independent temperature controls for the mold portions that form the various components of the food container. Therefore, the mechanical characteristics of the cover and tray components of known one-piece food containers are identical, and the cover and tray components of known food containers differ only in their shape and optical qualities. The tray component of such food containers having a substantially transparent cover is not adapted for use in microwave ovens or in any other uses requiring contacting food products at elevated temperatures.

OBJECTS OF THE INVENTION

It is an object of the present invention to provide a food container capable of reliable use to contain hot food products while still displaying the products.

It is another object of this invention to provide a low cost food container having these advantageous properties and that is appropriate for disposable use.

A further object of this invention is to provide a food container having these advantageous properties and provided with a tray and an integrally hinged cover to facilitate refuse collection and disposal of the food container and its contents.

A further object of the present invention is to provide a food container having a heat-resistant, opaque tray and an integral hinged, clear cover through which food products within the container can be displayed or inspected.

Yet another object of the present invention is to provide an inexpensive and effective method for producing a disposable food container having a heat-resistant tray and a hinged clear cover.

Other objects and advantages of the present invention will become apparent to those skilled in the art from the drawings, the detailed description of preferred embodiments and the appended claims.

SUMMARY OF THE INVENTION

The present invention provides a food container to contain food while being heated in a microwave oven. The food container consists of an opaque or colored tray formed from polyethylene terephthalate (PET). The PET used for this tray is in a crystalline state so as to have excellent heat distortion characteristics at elevated temperatures. The food container also comprises a clear cover formed from PET in its amorphous state. This clear cover allows for the display and inspection of food within the food container. The cover need not have superior heat distortion characteristics, and in the economical practice of this invention it does not, as it is not intended to come into contact with the hot food prepared in the microwave oven.

The present invention also provides a novel and economical mass-production method for producing a microwavable food container having the characteristics described above. This method begins with the step of extruding nucleated PET sheet using conventional means.

Next, the sheet is thermoformed by a special forming mold maintained at a low temperature to produce the cover portion of the PET in its amorphous form. Simultaneously, the portion of the mold used to form the tray component of the food container is heated by the mold or cooled at a controlled rate to crystallize the PET which comprises the tray component. A hinge connecting the cover component to the tray component is also thermoformed into the PET sheet; it can be heated or not at the operator's option. Accordingly, the method of the present invention creates a novel and advantageous hinged container having a clear cover through which food in the container may be readily inspected and also comprising an opaque or colored tray portion capable of remaining rigid even when in contact with food at elevated temperatures.

DETAILED DESCRIPTION OF THE INVENTION

Figure 1:
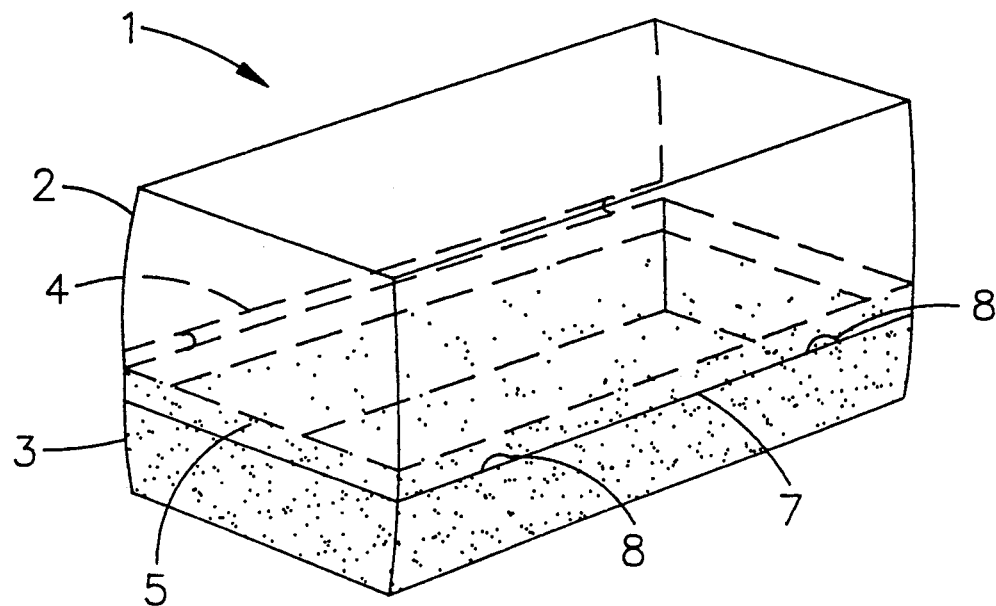
FIG. 1 shows a perspective view of the first embodiment of a microwavable food container in the closed configuration.

The following description is intended to refer to specific embodiments of the present invention illustrated in the drawings. The description is not intended to define or limit the scope of the invention, which is defined separately in the claims that follow.

Referring to FIG. 1, the number 1 designates a perspective view of an embodiment of the new microwavable food container in its closed configuration. A substantially clear cover component 2 is attached to an opaque or colored tray component 3 by means of a hinge component 4. The cover component 2 and tray component 3 have intermeshing grooves 7 to seal the two container components securely at their contacting area 5. The cover component 2 and tray component 3 also contain locking mechanisms 8 to assure that the cover component 2 and tray component 3 of the food container 1 remain securely closed when desired.

The cover component 2 of the food container 1 preferably comprises nucleated PET which is in its amorphous state. The amorphous cover component 2 is substantially clear and allows the display or inspection of food products contained within the food container 1. The tray component 3 comprises nucleated PET in its crystalline state. The tray component 3 is substantially opaque as the result of crystallization. The tray component 3 may optionally be colored or pigmented. The tray component 3 is preferably capable of remaining rigid at elevated temperatures, preferably temperatures up to or even exceeding 400° F.

Figure 2:
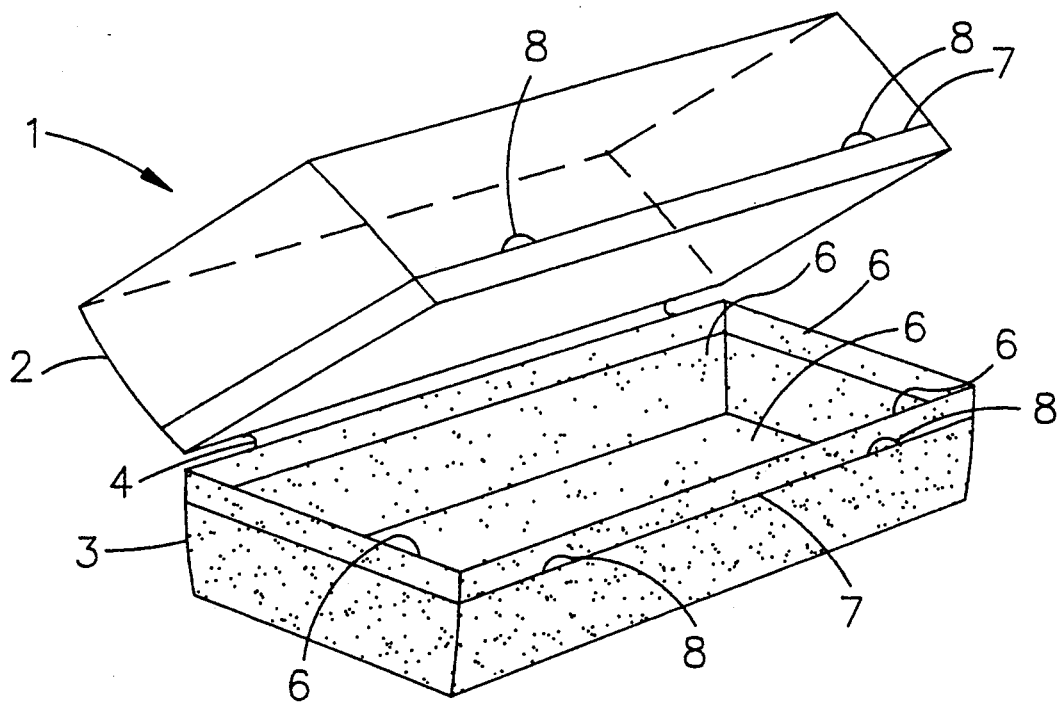
FIG. 2 shows a perspective view of the first embodiment of a microwavable food container in its partially opened configuration.

FIG. 2 designates a perspective view of an embodiment of the food container 1 in a partially open configuration. The hinge component 4 of the food container 1 integrally connects the cover component 2 of the food container 1 to the tray component 3 of the food container 1. The hinge component 4 is adapted to allow the folding of the cover component 2 over the tray component 3 to enclose food products within the food container 1. A hinge component 4 having a "C" cross-sectional configuration and extending less than the full length of the cover component 2 and tray component 3 where those components meet is preferred. However, any hinge configuration which provides for the flexing action between the cover component 2 and tray component 3 is suitable for purposes of the present invention.

The intermeshing grooves 7 of the cover component 2 and tray component 3 are intended to reduce heat loss of food products within the closed food container 1. The intermeshing grooves 7 may have a tongue and groove configuration or any other groove configuration known in the art.

The locking mechanisms 8 on the cover component 2 and tray component 3 are intended to maintain the food container 1 in its closed configuration when desired. For example, the food container 1 may be closed during food preparation to provide proper heating of the food product, during service of the food product to keep the enclosed food hot, and during the disposal of the food container 1 to enclose debris in one compact package. The locking mechanisms 8 can preferably be in the form of male/female interlocking shapes molded into the cover component 2 and tray component 3. However, any known locking mechanism can be used for purposes of the present invention.

The food contacting surfaces 6 of the tray component 3 are capable of remaining rigid when in direct physical contact with food products at elevated temperatures. The food contacting surfaces 6 of the tray component 3 preferably remain rigid at temperatures up to approximately 400° F.

Figure 3:
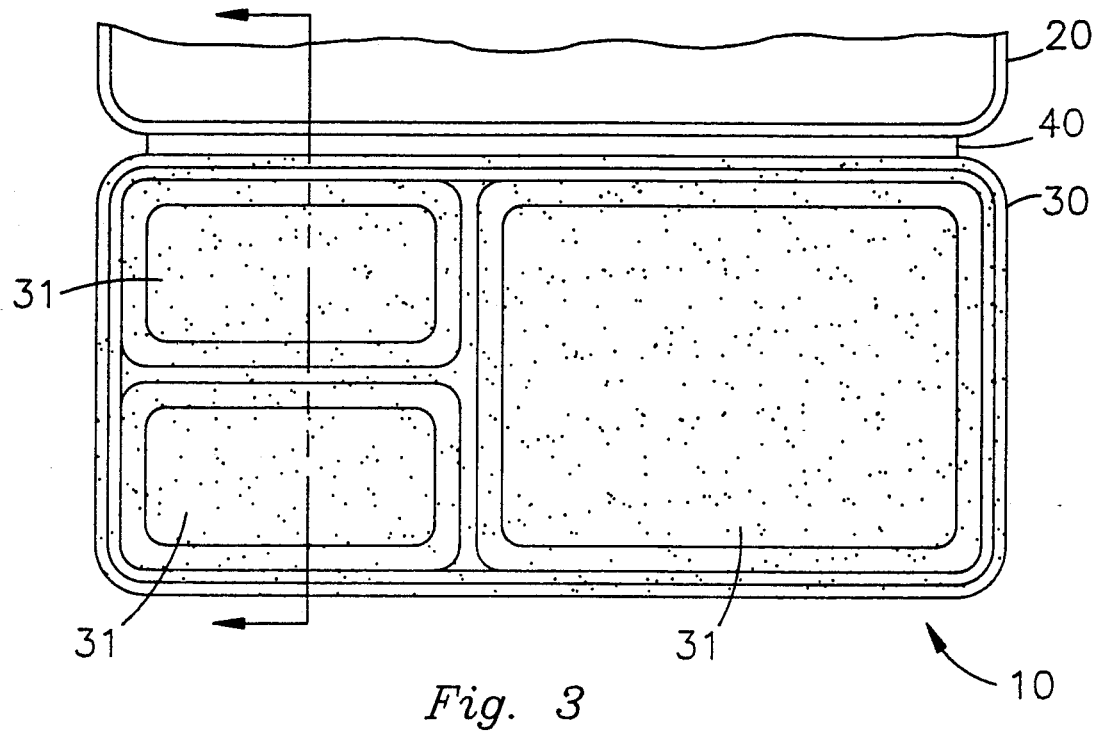
FIG. 3 shows a top view of the second embodiment of a microwavable food container having a tray component with separate compartments for different food products.

FIG. 3 shows a top view of the second embodiment of the food container 10 having a cover component 20, a tray component 30, and a hinge component 40 integrally connecting the cover component 20 to the tray component 30. The tray component 30 has a plurality of compartments 31 adapted to hold differing food products. Food products intended to be kept separate or requiring a different preparation process may be placed in each of the separate compartments 31. For example, a food product that is intended to be served while cold may be placed in one compartment 31 while food products intended to be served while hot can be placed in other compartments 31. This separation of hot and cold food products also enables the selective heating of food products during food preparation. For example, slight modification to the tray component 30 and cover component 20 of the food container 10 will enable selective heating of food products in each of the compartments 31 during food preparation in a microwave oven.

Figure 4:
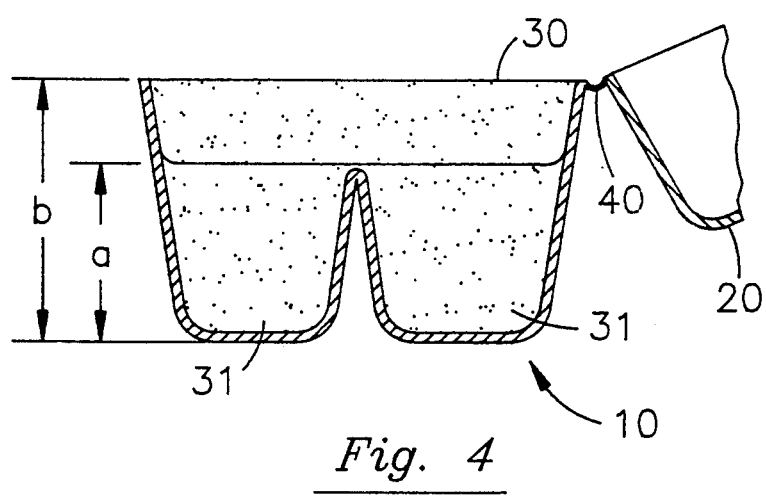
FIG. 4 shows a cross-sectional view of the second embodiment of a microwavable food container having a tray component with separate compartments for different food products.

FIG. 4 is a cross-sectional view of the tray component 30 of the food component 10. The compartments 31 are shown as they may be formed into the tray component 30. The compartments 31 may have a depth "a" less than the height "b" of the tray component 30 as indicated in FIG. 4. However, the depth "a" of the compartments 31 may also be the same or even greater than the height "b" of the tray component 30.

The new method for producing the microwavable food container described above uniquely utilizes the properties of PET to form a product having the desired characteristics outlined above. PET is a crystalline polymer having a melting point of approximately 550° F. Below this melting point, PET in its crystalline state remains essentially rigid. Above this melting point, PET melts, becoming a fluid having a very low viscosity.

If PET resin is cooled rapidly, it will remain in an amorphous state. The PET resin can be rapidly cooled prior to thermoforming by means of extrusion through a sheet die followed by cooling of the PET sheet on a cold roll surface. In this state, the PET resin is clear and can be softened at temperatures of around 180° F. Such amorphous PET resin can also be thermoformed by conventional means at temperatures in the range of 280°-350° F. If thermoformed in a cold mold, the PET resin is rapidly cooled and remains in its amorphous state.

If, however, PET resin is maintained at an elevated temperature for a prolonged period, it will slowly crystallize and assume a milky appearance due to crystal formation and the associated scattering of light. Such crystallization can occur at temperatures above about 220° F., for example. In the crystalline state the PET resin is capable of remaining rigid at temperatures up to approximately 400° F.

The crystallization of PET can be greatly accelerated when the PET resin contains a small amount of a nucleating agent. A variety of nucleating agents are known and are commercially available. In fact, any foreign material which can be easily dispersed throughout PET resin in microparticles can be used as a nucleating agent for purposes of the present invention. It is these microparticles that offer nuclei for the formation of crystals within the PET resin.

These nucleating agents are mostly polyolefins or fine particle solids. For the purposes of the present invention, any of the following nucleating agents can be added to PET to accelerate crystallization: silica, talc, carbon black, polyolefin and titanium dioxide.

When nucleated PET resin is thermoformed in a mold maintained at an elevated temperature, it will rapidly crystallize. Upon removal from the mold, the crystallized PET will retain the properties which allow it to remain rigid at elevated temperatures. The crystallization of nucleated PET has been discovered to occur within a temperature range of about 330°-400° F. When the mold is maintained at those elevated temperatures, the nucleated PET resin will crystallize in approximately 3-6 seconds, for example.

Also, when nucleated PET resin is thermoformed and then cooled slowly, it will crystallize. It is known that controlling the rate at which PET resin is cooled to limit the cooling rate will cause nucleated PET resin to crystallize.

Preferably, the PET resin should contain approximately 0.5-5% of such a nucleating agent to promote rapid crystallization. Less than 0.5% of such a nucleating agent may not be sufficient to accelerate crystallization and more than 5% may deteriorate the properties of the PET resin.

Figure 6:
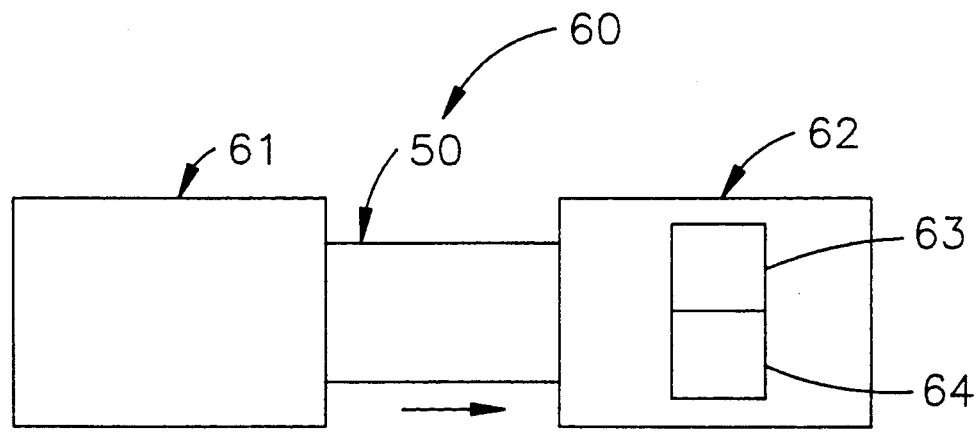
FIG. 6 is a schematic plan view illustrating a preferred method of making a microwavable food container according to this invention.

FIG. 6 is a schematic plan view illustrating a preferred method 60 of making the food container described above. The new method for producing a microwavable food container comprises the steps of extruding nucleated PET sheet 50 by means of extruder 61, thermoforming the nucleated PET sheet into a one-piece food container by means of thermoforming mold 62, and controlling the thermoforming mold temperatures in separate mold portions 63 and 64 to create food container components having specific mechanical and optical properties. Other steps can be added to this method without reaching beyond the scope of this invention.

To create the nucleated PET sheet from which the new food container is formed, two nucleated PET resins may be side-by-side co-extruded into a single, continuous sheet. One or both of the nucleated PET resins may contain pigmentation depending on the manufacturer's preference. If such pigmentation is desired, any known and commercially available pigment can be added to the PET resin at a point before or during the co-extrusion of the PET sheet.

Figure 5:
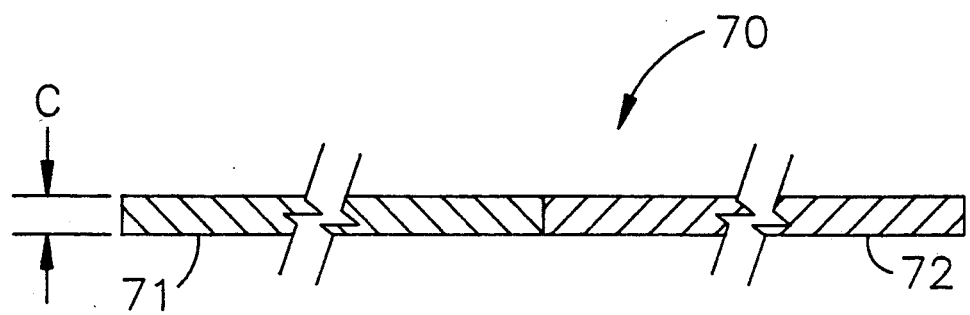
FIG. 5 shows a cross-sectional view of the co-extruded polyethylene terephthalate sheet from which the microwavable food container may be formed.
Figure 7:
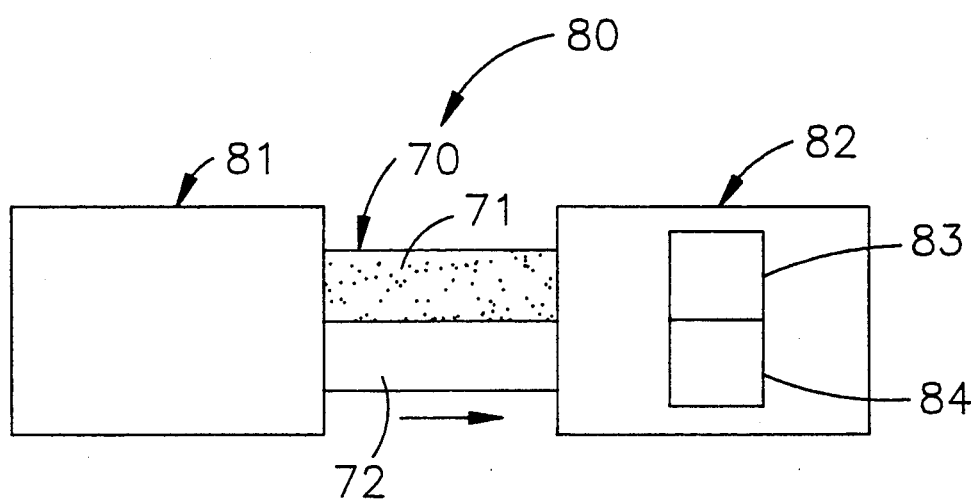
FIG. 7 is a schematic plan view illustrating a preferred method of making a microwavable food container having a pigmented tray component.

Co-extrusion of two or more nucleated PET resins can be accomplished by any means known in the art. For example, co-extrusion may be performed according to the method described in U.S. Pat. No. 4,533,510. Also, an extrusion die similar to the one described in that patent can be used to create co-extruded sheet in accordance with the present invention. Referring to FIGS. 5 and 7, co-extruded PET sheet 70 has a first portion 71, a second portion 72, and a thickness "c." The first portion 71 contains pigmentation. The second portion 72 contains substantially non-pigmented PET resin and remains substantially clear.

The co-extruded PET sheet 70 may contain any proportion of the first portion 71 and the second portion 72. This proportion, however, should preferably remain constant throughout the continuous co-extrusion process. It is also preferable that the proportion of the first portion 71 to the second portion 72 remain substantially equal.

The thickness "c" of the co-extruded sheet 70 must be adapted for thermoforming so that it can be formed into the various components of the food container of the present invention. The thickness "c" of the sheet 70 may be constant throughout the entire sheet 70, or may vary so as to permit the formation of a food container having the desired characteristics.

For example, the thickness "c" of the first portion 71 of the sheet 70 can be different from the thickness "c" of the second portion 72 of the sheet 70. This would permit the production of a food container having tray and cover components of different thicknesses. Also, the thickness "c" of the sheet 70 can vary within the first portion 71 and the second portion 72. This would permit the production of a food container having tray and cover components adapted to optimize the manner in which the food is prepared.

The co-extruded PET sheet 70 is then advanced to a thermoform mold 82 to thermoform the sheet 70 into the new microwavable food container. The mold 82 used to thermoform the sheet has at least two separate portions 83 and 84 adapted to form each of the microwavable food container components. Although FIG. 8 shows two separate mold portions 83 and 84, the present invention encompasses a thermoform mold 82 having two or three or more mold portions. Portion 83 of the mold 82 is adapted to form the tray component of the new food container, and a second portion 84 of the mold 82 is adapted to form the cover component of the new food container. The first portion 83 and second portion 84 of the mold 82 are capable of independent temperature control during the thermoforming step of this new process.

According to the present invention, each of the mold portions described above are individually temperature controlled so as to form a food container having components with the desired mechanical and optical characteristics. The tray component of the food container will be in direct contact with food at elevated temperatures. Therefore, the tray component must be formed from crystallized PET resin so that it will remain rigid when in contact with hot food products. The first portion 83 of the mold 82 forms the portion 71 of the co-extruded PET sheet 70 containing the pigmentation. The first portion 83 of the mold 82 used to form the tray component will be maintained at an elevated temperature for a predetermined time span to allow the tray component to crystallize. Preferably, the first portion 83 of the mold 82 will be maintained at a temperature in the range of about 330°-400° F. Also, the tray component of the food container will preferably be maintained at this temperature within the first portion 83 of the mold 82 for a period of 3-6 seconds before the thermoformed food container is removed from the mold 82.

Similarly, the tray component of the food container formed in the first portion 83 of the mold 82 may be cooled at a controlled rate at which the nucleated PET resin in the tray component will crystallize.

The second portion 84 of the mold 82 used to form the cover component is temperature controlled so as to maintain the amorphous characteristics of the nucleated PET resin within the cover component. The second portion 84 of the mold 82 is maintained at a low temperature in order to rapidly cool the cover component during thermoforming. Preferably, the cover component of the food container should be thermoformed at about 280°-350° F.

The mold 82 also forms the hinge component connecting the cover component to the tray component. After a food product is placed on the tray component of the food container, the food container can be folded together about the hinge so that the cover component may contact the tray component to enclose the food product. It is preferable that the hinge component should have a configuration to allow an appropriate flexing action.

The thermoforming process may be performed by utilizing a vacuum mold, a pressure mold, or some combination of a vacuum or pressure mold. When the cover component is referred to as being clear or transparent, it is meant that the contents of the microwavable food container are visible from the outside of the container through the container's cover. When the tray component of the microwavable food container is referred to as opaque or colored, it is meant that the tray component is white, black, or colored as the result of resin pigmentation, or that the tray component is milky or essentially opaque as a result of the crystallization process during the formation of the microwavable food container. Also, crystallized PET is also known as CPET, and amorphous PET is known as A-PET.

If desired, many changes and modifications to the microwavable food container and method of producing the new microwavable food container described herein can be made without departing from the spirit and scope of this invention. For example, a microwavable food container according to the present invention can have a cover component and tray component of any configuration or dimension. Accordingly, the new food container can be circular, rectangular, square, or any other shape when viewed from the top, bottom or sides. Also, a food container according to the present invention can contain designs in the cover component and tray component that are applied during the thermoforming process, in a subsequent pigmentation operation, or in any other manner known in the art. Such designs can be purely ornamental in nature, relate to the desired food preparation characteristics, or represent a combination of aesthetic and utilitarian functions. Moreover, the depth of the cover component and the tray component may be the same or very different depending upon the nature of the food product to be contained within the container, the appearance desired by the manufacturer, the ease in which the food container is stacked and manipulated by the consumer, or any other factor relevant to the overall shape of the food container product.

Likewise, steps may be added to the method of the present invention without escaping the scope of this invention. Accordingly, steps associated with the ornamentation, stacking, trimming, or any other processing stages are contemplated as included within the present invention.

This invention has a number of important features and advantages in any embodiment or construction. The microwavable food container described herein provides a container capable of holding food products as they are prepared in a microwave oven as well as a container for presenting prepared meals or snacks to the ultimate consumer. The clear cover of the new microwavable food container allows the provider or consumer to visually inspect the contents of the container without opening the container. Also, the container's one-piece construction allows for easy disposal of the microwavable food container as well as any food debris that is enclosed in the container.

The method of producing the food container described herein also has significant advantages. For example, the method described herein allows a manufacturer to form a food container having the benefits outlined above from a single, nucleated PET resin. This eliminates the need to co-extrude dissimilar PET resins unless the manufacturer elects to produce a food container having a pigmented tray or cover component. If a pigmented tray or cover is desired, co-extrusion of pigmented and non-pigmented nucleated PET resin may be performed in accordance with the present invention.

I claim:

1. A one-piece food container thermoformed from a polyethylene terephthalate sheet, said polyethylene terephthalate sheet containing a nucleating agent, said food container comprising:
    (a) a substantially opaque tray component formed from said nucleated polyethylene terephthalate sheet, said nucleated polyethylene terephthalate sheet in said tray component being in a crystalline state;
    (b) a substantially transparent cover component formed from said nucleated polyethylene terephthalate sheet, said nucleated polyethylene terephthalate sheet in said cover component being in an amorphous state and substantially free of crystals; and
    a nucleated polyethylene terephthalate integral hinge component connecting said cover component to said tray component.

2. The food container described in claim 1, wherein said nucleated polyethylene terephthalate sheet contains about 0.5-5.0% of said nucleating agent.

3. The food container described in claim 1, wherein said nucleating agent is selected from the group consisting of silica, talc, carbon black, polyolefin and titanium dioxide.

4. The food container described in claim 1, wherein said tray component is formed from a portion of said nucleated polyethylene terephthalate sheet containing pigmentation.

5. The food container described in claim 4, wherein said tray component is colored.

6. The food container described in claim 1, wherein said tray component remains substantially rigid at temperatures up to at least about 400° F. and has a melting temperature of at least about 550° F.

7. The food container described in claim 1, wherein said container is microwavable.

* * * * *